(12) United States Patent
Ling

(10) Patent No.: US 7,967,946 B2
(45) Date of Patent: Jun. 28, 2011

(54) ETHANOL CONTINUOUS FLOW BOILER

(75) Inventor: Michael R. Ling, Alpharetta, GA (US)

(73) Assignee: Michael R. Ling, Alpharetta, GA (US)

( * ) Notice: Subject to any disclaimer, the term of this patent is extended or adjusted under 35 U.S.C. 154(b) by 1122 days.

(21) Appl. No.: 11/642,088

(22) Filed: Dec. 20, 2006

(65) Prior Publication Data

US 2007/0137997 A1    Jun. 21, 2007

Related U.S. Application Data

(60) Provisional application No. 60/597,829, filed on Dec. 20, 2005.

(51) Int. Cl.
*B01D 1/30* (2006.01)
*B01D 3/02* (2006.01)

(52) U.S. Cl. ....... 159/28.1; 122/233; 122/459; 122/491; 159/28.2; 159/44; 165/161; 165/171

(58) Field of Classification Search .................. 122/233, 122/459, 491; 159/28.1, 28.2, 44; 165/161, 165/171, DIG. 196
See application file for complete search history.

(56) References Cited

U.S. PATENT DOCUMENTS

| | | | |
|---|---|---|---|
| 1,892,654 A | 12/1932 | Miller | |
| 2,589,406 A | 3/1952 | Latham | |
| 2,663,089 A | 12/1953 | Coats | |
| 3,035,060 A | 5/1962 | Binning et al. | |
| 3,105,020 A | 9/1963 | Silver et al. | |
| 3,152,053 A | 10/1964 | Lynam | |
| 3,334,024 A | 8/1967 | Zahavi | |
| 3,589,984 A | 6/1971 | Reid | |
| 3,620,282 A * | 11/1971 | Newton | 159/13.4 |
| 3,763,012 A * | 10/1973 | Kelley | 202/93 |
| 4,139,584 A | 2/1979 | Holmberg | |
| 4,210,494 A | 7/1980 | Rhodes | |
| 4,215,668 A * | 8/1980 | Holcombe et al. | 126/60 |
| 4,285,774 A | 8/1981 | Rajamannan | |
| 4,375,751 A * | 3/1983 | McCord | 62/126 |
| 4,510,242 A | 4/1985 | Tedder | |
| 4,541,897 A | 9/1985 | Sommer et al. | |
| 4,572,767 A * | 2/1986 | McCord | 202/170 |
| 4,657,638 A | 4/1987 | le Grand et al. | |
| 4,805,694 A * | 2/1989 | Ayub | 165/158 |
| 4,976,824 A | 12/1990 | Lee | |
| 5,106,425 A * | 4/1992 | Sluga et al. | 134/10 |
| 5,232,557 A | 8/1993 | Kontu et al. | |
| 5,312,524 A | 5/1994 | Barcomb | |
| 5,316,628 A | 5/1994 | Collin et al. | |
| 5,467,424 A * | 11/1995 | Davies et al. | 392/401 |
| 5,490,906 A | 2/1996 | Lee | |
| 5,575,889 A * | 11/1996 | Rosenblad | 159/49 |
| 6,623,640 B2 * | 9/2003 | Lanting et al. | 210/603 |

(Continued)

*Primary Examiner* — Virginia Manoharan
(74) *Attorney, Agent, or Firm* — Lance Reich; Woodcock Washburn

(57) ABSTRACT

An improved boiler that allows distillation of ethanol from a continuous flow of a hydrous feedstock compound, which may be beer or other semi-solid substance. The internal compartment of the boiler is separated into different zones by a plurality of primary baffle plates and secondary baffle plates. The hydrous feedstock compound is heated as it passes from one zone to another zone and ethanol inside the hydrous feedstock compound vaporizes. The ethanol rich vapor is channeled through a collector column and then collected for further processing. The temperature of the hydrous feedstock compound is slightly different from one zone to another zone because of ethanol concentration changes as the hydrous feedstock compound moves from one zone to another. At the last zone, where most of ethanol is removed, the remaining hydrous feedstock compound is removed from the boiler.

10 Claims, 6 Drawing Sheets

U.S. PATENT DOCUMENTS

| | | |
|---|---|---|
| 2004/0231970 A1 | 11/2004 | Lee et al. |
| 2005/0061025 A1* | 3/2005 | Ayub .............................. 62/515 |
| 2007/0029064 A1* | 2/2007 | Baginski et al. ................ 165/10 |
| 2008/0190593 A1* | 8/2008 | Wang et al. ................... 165/159 |

* cited by examiner

ETHANOL CONTINUOUS FLOW BOILER

CROSS-REFERENCE TO RELATED APPLICATION

This application claims the benefit of U.S. Provisional Patent Application No. 60/597,829, filed on Dec. 20, 2005, the entirety of which is hereby incorporated herein by this reference.

BACKGROUND OF THE INVENTION

1. Field of the Invention

The present invention generally relates to apparatuses for distillation. More particularly, the present invention relates to a boiler that distills ethanol from a continuous flow of feedstock.

2. Description of the Related Art

Ethanol is gaining wide popularity as a fuel, particularly when used as a component mixing with gasoline. Gasoline mixture may contain up to about 10 vol. % ethanol, without modifications to presently used automobile engines being required, thereby extending the volume of motor fuel availability by a like percentage. Ethanol has been produced for thousands of years around the world. Distilled spirits (higher concentrations of ethanol in water) is made from fermenting, boiling, and condensing beer or wine. Ethanol is completely miscible in water, allowing a homogenous solution of 0% to 100% ethanol to water mixture. Ethanol boils off at a lower temperature than water, allowing the ethanol to be concentrated through distillation. However, at a 96% ethanol to water mixture, the ethanol and water will boil at the same temperature (an azeotropic mixture). This 96% concentration is the knee on the curve that distillation cannot overcome when one works to remove all of the water in ethanol.

The primary source of the ethanol used in gasohol is derived primarily from the fermentation of mash, and usually from corn. Natural fermentation is able to produce an ethanol-water product mixture containing about 12-20 vol. % ethanol. This mixture may easily be concentrated by distillation to about 95% ethanol. Higher concentrations of ethanol, however, as required in a mixture of gasoline with ethanol, are obtained only by dehydration methods other than distillation due to the formation of an ethanol-water azeotrope at about the 95% ethanol concentration.

The ethanol producing process for small producers is generally in batch mode. It starts with a mixture of the fermentation of mash that enters in a boiler and then the mixture is heated to extract the ethanol. After boiling the mixture for a certain period, the remaining mixture is drained and removed from the boiler. After the boiler is emptied, a new batch of the mixture is fed into the boiler and the cycle repeats. This batch mode is time consuming since, for each cycle, it involves filling up and emptying the entire content of the boiler and consumes more energy since the boiler cools down during the replenishing of the mixture. It is also difficult for the batch mode to recover heat from spent mesh.

Thus, it is desirable to have a system that is energy efficient and can continuously distill ethanol, and it is to such a system the present invention is primarily directed.

SUMMARY OF THE INVENTION

The present invention enables the possibility of continuous distillation of ethanol from a continuous flow of feedstock. In one embodiment, there is provided an ethanol boiler with a substantially horizontal main body having a hollow interior thereof. The hollow interior has a top portion and bottom portion and first end and second end. The first end includes an inlet for admitting a flow of an ethanol-containing semi-liquid feedstock into the interior of the body, and the second end includes an outlet for the semi-liquid feedstock. The ethanol boiler also includes a plurality of baffle plates within the interior of the body between the first end and second end, at least one heating element for heating the semi-liquid feedstock while the feedstock passes from the inlet to the outlet, and at least one vent on the top portion of the body. The vent allows vaporous ethanol to exit from the interior of the body. Each baffle plate has at least one passage therethrough to allow passage of the semi-liquid feedstock from the inlet to the outlet.

In another embodiment there is provided a method for distilling ethanol from a hydrous feedstock compound using a continuous flow boiler with a plurality of heating zones. The method includes admitting the hydrous feedstock compound into the continuous flow boiler, heating the hydrous feedstock compound, collecting ethanol vapor resulted from heating the hydrous feedstock compound, moving the hydrous feedstock compound through the plurality of heating zones, and draining the hydrous feedstock compound from the continuous flow boiler.

Other objects, features, and advantages of the present invention will become apparent after review of the hereinafter set forth in Brief Description of the Drawings, Detailed Description of the Invention, and the Claims.

DETAILED DESCRIPTION OF THE INVENTION

The present invention relates to a process of production of ethanol. A hydrous feedstock compound containing ethanol, water, and potentially some impurities from the fermentation is fed into a boiler that is divided into different zones. The hydrous feedstock compound may be beer or other semi-solid substance. The hydrous feedstock compound, which is ethanol-containing semi-liquid feedstock, results from fermentation of corn or other suitable farm products and is fed into the boiler and heated as it moves from one zone to a next zone. Because of different boiling temperatures, ethanol boils first and vaporizes. The vapor containing ethanol is channeled through a separator column and collected for further dehydration. The boiler with multiple zones allows different temperature in each zone since the concentration of ethanol changes as the hydrous feedstock compound moves from one zone to another. The continuous flow boiler improves the efficiency of the process for distilling ethanol by improving the throughput and efficiency of batch processes, as is common in prior art distillers and boilers. However, some vertical columns can still be used in conjunction with or as part of the present inventive boiler.

Figure 1:
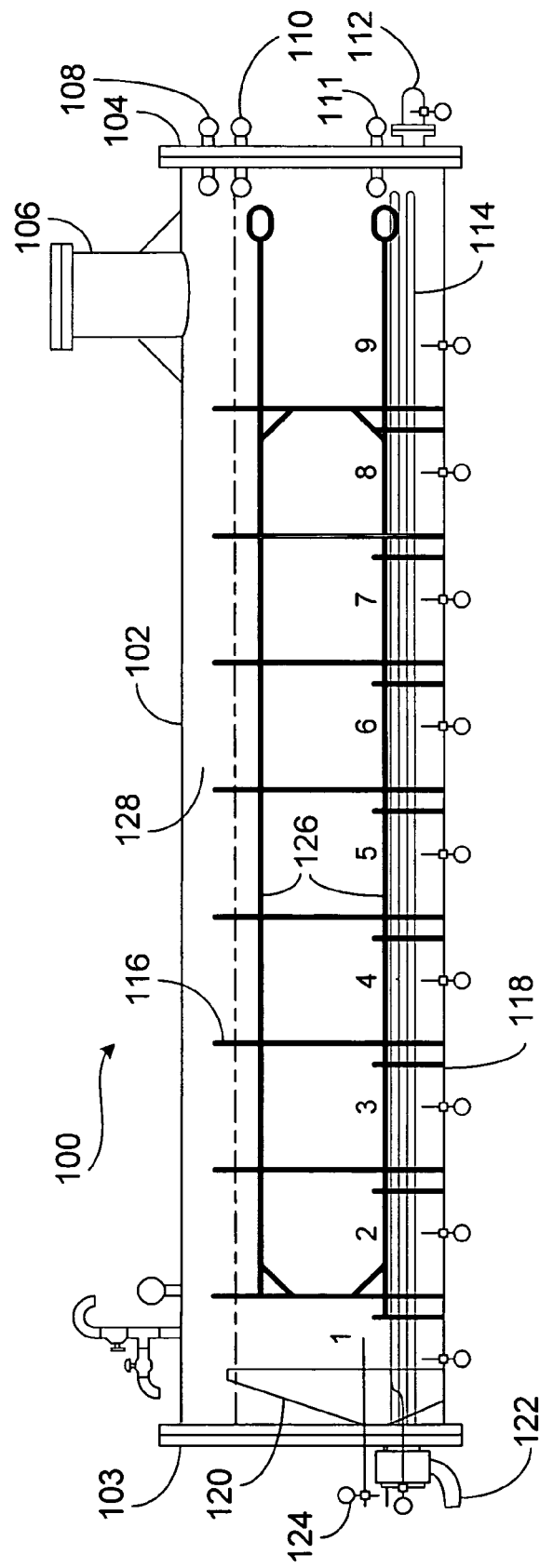
FIG. 1 illustrates a cross-section of one embodiment of a boiler according to the invention.
Figure 9:
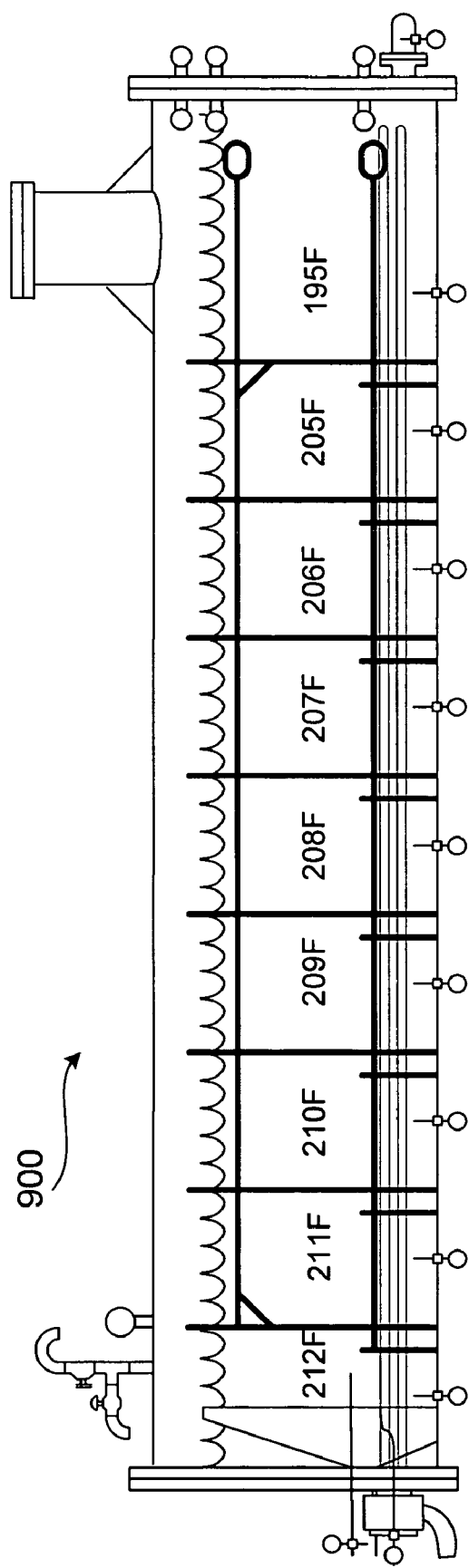
FIG. 9 illustrates a cross-section of the boiler when the distillation process has reached near equilibrium after some length of time.

FIG. 1 illustrates a schematic of a multi-zone horizontal, hollow compound boiler 100. The multi-zone compound boiler 100 includes preferably a cylindrical boiler shell 102. The compound boiler 100 is manufactured from a metallic material, preferably a corrosion resistant material. The cylindrical boiler shell 102 is enclosed on both ends by two circular plates 103, 104, and thus forming an internal compartment (chamber). The internal compartment is divided into multiple zones through multiple primary baffle plates 116 and secondary baffle plates 118. The primary baffle plates 116 and secondary baffle plates 118 are placed inside the internal compartment. FIG. 9 illustrates a total of nine zones inside the compound boiler 100; however, it is to be understood that the compound boiler 100 may have a different number of zones. Alternatively, the secondary baffle plates 118 may not be needed. The features of the secondary baffle plates 118 may be incorporated into the primary baffle plates 116.

Figure 2:
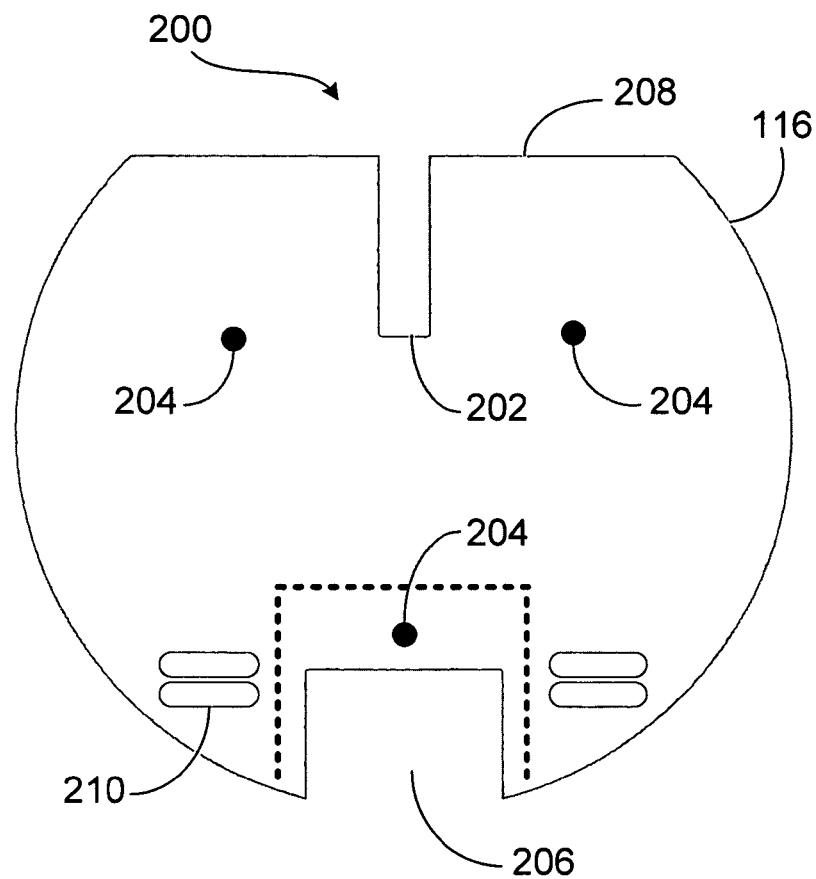
FIG. 2 illustrates a primary baffle plate of the invention.

FIG. 2 illustrates a schematic 200 for a primary baffle plate 116. The primary baffle plate 116 is generally circular with a secant edge 208, a liquid flow channel 206, a floating solid channel 202, passages 204 for support rods 126 (shown in FIG. 1), and one or more holes 210 for heating elements 114 (shown in FIG. 1). The secant edge 208 allows the top portion of the internal compartment to form a vapor flow channel 128 (shown in FIG. 1), which is shared by all zones, and thus permitting the vapor from each zone to move toward a separator column 106 (shown in FIG. 1). The separator column 106 acts like a vent to the boiler 100 collecting vapor exiting from the boiler 100. Those skilled in the art will appreciate that multiple separator columns may be used with the boiler 100.

Figure 3:
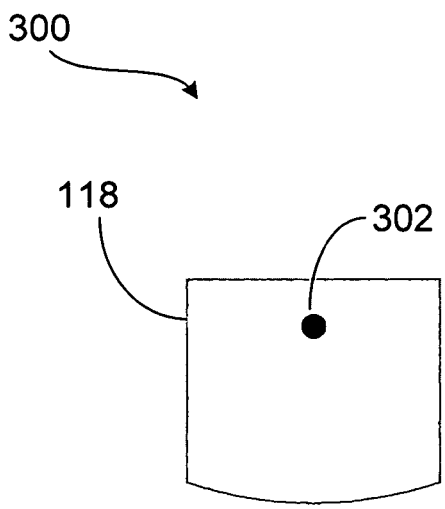
FIG. 3 illustrates a secondary baffle plate of the invention.

FIG. 3 illustrates a schematic 300 for a secondary baffle plate 118. The secondary baffle plate 118 has a size that allows it to cover the liquid flow channel 206 when overlaid over the primary baffle plate 116. The secondary baffle plate 118 has a passage 302, which is approximately the same size as the passage 204, for a support rod 126.

The compound boiler 100 receives the hydrous feedstock compound through an inlet 112 connected to the circular plate 104. The compound boiler 100 is equipped with a plurality of heating elements 114. The heating elements 114 may be electrical heating rods; alternatively, the heating elements 114 may also be gas or hot liquid powered. The heating elements 114 go through the primary baffle plates 116 and heat the hydrous feedstock compound in each zone. The heating elements 114 may be removed from the assembly of the primary baffle plates 116 and the compound boiler 100 for maintenance, cleaning, and repair. The hydrous feedstock compound passes through different zones and is finally collected by an outlet 120. The hydrous feedstock compound collected by the outlet 120 is channeled through a connection 122 to external facilities for further processing. The continuous nature of the boiler allows the hydrous feedstock compound coming out from the connection 122 can be used to preheat the liquid entering in the inlet 112 thereby gaining energy efficiency.

The compound boiler 100 is equipped with a liquid level controller 110 and an overfill level controller 108. The level of the hydrous feedstock compound inside the compound boiler 100 is sensed by a liquid level controller 110. When the level of the hydrous feedstock compound drops below the liquid level controller 110, additional hydrous feedstock compound is pumped or fed into the compound boiler 100. The overfill level controller 108 can sense the overflow condition. If an overflow condition is detected, the overfill level controller 108 sends a signal to stop the operation of the compound boiler 100. The compound boiler 100 may also be equipped with an underfill level controller 111 for sensing the underfill condition. A prolong indication of low level by the underfill level controller 111 will shut down the operation of the compound boiler 100, since it may be an indication of malfunction of the compound boiler 100.

The compound boiler 100 is also equipped with a thermo-controller 124. The thermo-controller 124 senses the temperature of the hydrous feedstock compound and controls the outlet 120 accordingly. Under a certain pressure condition, the majority of ethanol inside the hydrous feedstock compound would have vaporized at a given temperature. When the thermo-controller 124 detects at a preset temperature, the thermo-controller 124 sends signal to open the outlet and a quasi-ethanol free hydrous feedstock compound will flow out from the compound boiler 100.

The internal compartment of the compound boiler 100 is divided into different zones by the primary baffle plates 116 and the secondary baffle plates 118, each zone 1-9 being a boiling zone. The primary baffle plates 116 prevent significant hydrous feedstock compound exchange between boiling zones. Separated zones allow the hydrous feedstock compound to be boiled at different temperatures and ethanol concentrations. The primary baffle plates 116 and the secondary baffle plates 118 are held in position by the support rod 126. It is understood that multiple support rods may also be used. The heating elements 114 extend through all the zones and heat hydrous feedstock compound in each boiling zone. Those skilled in the art will also appreciate that individual heating elements may be employed for each zone. The secondary baffle plates 118 placed in the lower portion of the internal compartment of the compound boiler 100 limit the exchange of significant amounts of hydrous feedstock compound and heat when the level of the hydrous feedstock compound in adjacent zones are equal or similar.

Though the compound boiler 100 is separated into different zones, the hydrous feedstock compound may flow from one zone to an adjacent zone through the liquid flow channel 206. The sediments may also flow from one zone to another through the liquid flow channel 206. Floating solids that may be present in the hydrous feedstock compound can move from one zone to another through the floating solids channel 202. The floating solids channel 202 permits passage of the floating solids without significant passage of the hydrous feedstock compound or heat exchange between adjacent zones.

As the heating elements heat the hydrous feedstock compound in each zone, the ethanol inside the hydrous feedstock compound vaporizes. The ethanol rich vapor flows through the vapor flow channel 128 toward the separator column 106. The vapor will be collected at different facility to further process the ethanol.

Figure 4:
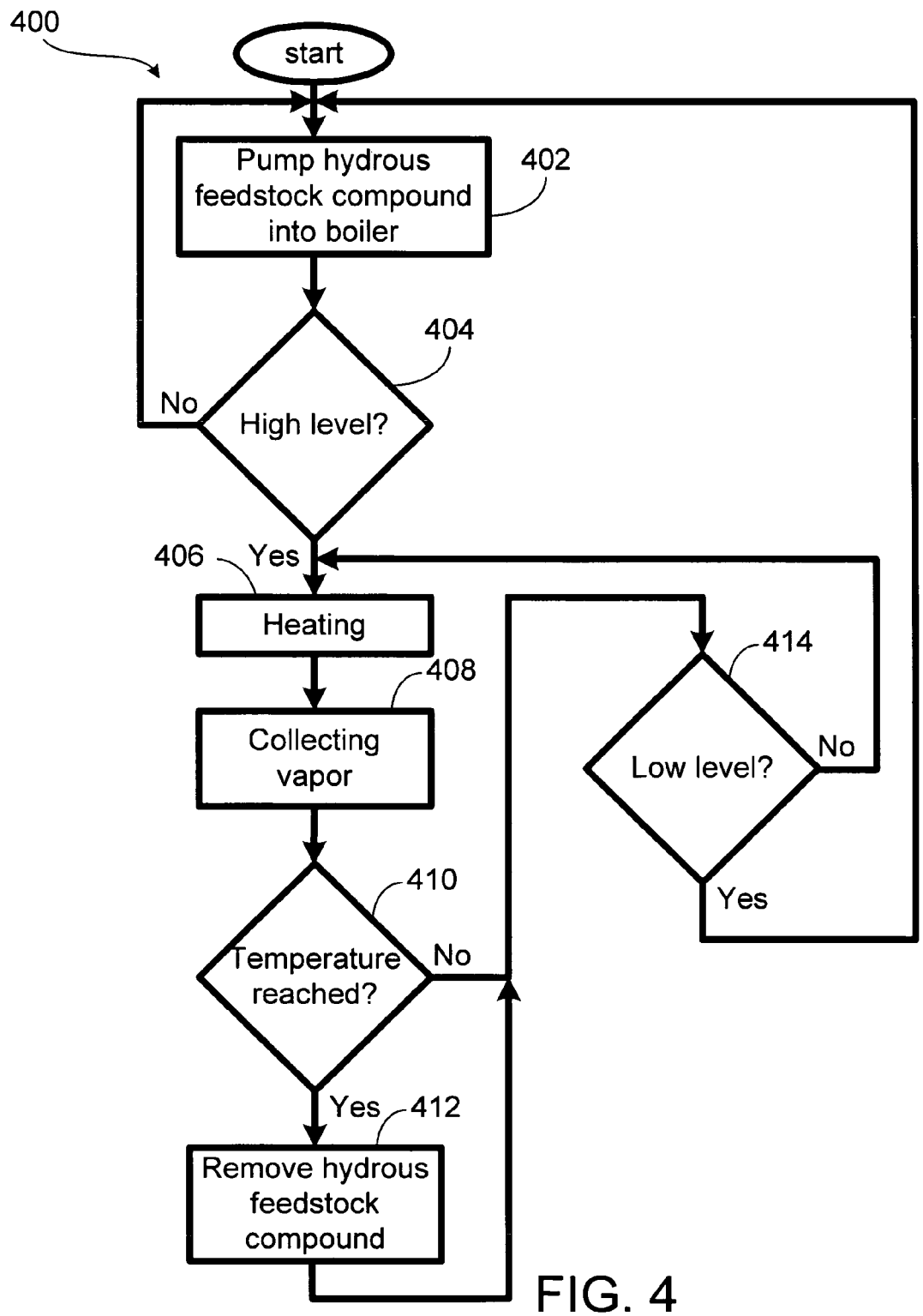
FIG. 4 is a flow chart for an ethanol distillation process according to the invention.

FIG. 4 is a flow chart 400 for an ethanol distillation process according to the invention. Liquid containing ethanol (the hydrous feedstock compound) is sucked, pumped, or otherwise admitted into the boiler 100 through the inlet 112, step 402, until a high-level mark is reached, step 404. The high level of the hydrous feedstock compound is sensed by the liquid level controller 110. Once the boiler 100 is at its full capacity, the heating elements 114 are energized, step 406. Boiling of the hydrous feedstock compound occurs, and ethanol vapor passes from each zone through the vapor flow channel 128 exits the boiler 110 through the separator column 106, step 408. Boiling continues until a preset temperature is sensed by the thermo-controller 124, step 410. The preset temperature approaches the boiling point of water at the pressure present in the boiler 100. When the preset temperature is reached, it is an indication that the ethanol is mostly vaporized, and a portion of hydrous feedstock compound can be removed from the boiler 100 through the outlet 120, step 412. The hydrous feedstock compound removed from the boiler 100 may be carrying out the spent liquid, floating solids, and sediment. The removal of the hydrous feedstock compound stops when the thermo-controller 124 senses a significant portion of the hydrous feedstock compound has been removed and additional hydrous feedstock compound will be introduced into the boiler 100. The thermo-controller 124 may be able to sense the removal of the hydrous feedstock compound because when cooler liquid from the adjacent zone flow across the thermo-controller 124, the thermo-controller 124's temperature will decrease significantly. Alternatively, a given quantity of liquid may be pumped from the boiler 100 at a given periodicity to match a given heat input via the heating element.

During the ethanol distillation process, the liquid and sediment in the hydrous feedstock compound pass through the liquid flow channel 206 and liquid and floating solids pass through the floating solids channel 202 from one zone to an adjacent zone because a difference in the liquid levels in adjacent zones causes a differential pressure. The liquid flow continues between the zones until the zone with the liquid level controller 110 senses a low hydrous feedstock compound level. Additional hydrous feedstock compound is sucked or pumped into the boiler 100 through the inlet 112 to raise the liquid level. If the liquid level is not controlled, the overfill level controller 108 or the underfill level controller 111 shuts down the operation of the boiler 100. Ethanol in the hydrous feedstock compound vaporizes and cools down the hydrous feedstock compound inside the boiler 100. An equilibrium is established where different zones boil the ethanol at different temperatures due to the different concentrations of ethanol. The different temperatures and concentrations are maintained due to the primary baffle plates 116 and the secondary baffle plates 118. The level of the hydrous feedstock compound is maintained by the liquid level controller 110 and ethanol concentrations are controlled by sensing the temperature via the thermo-controller 124 and pumping the spent liquid out of the outlet 120. The heating elements 114 boil the ethanol and maintain the temperature.

Figure 5:
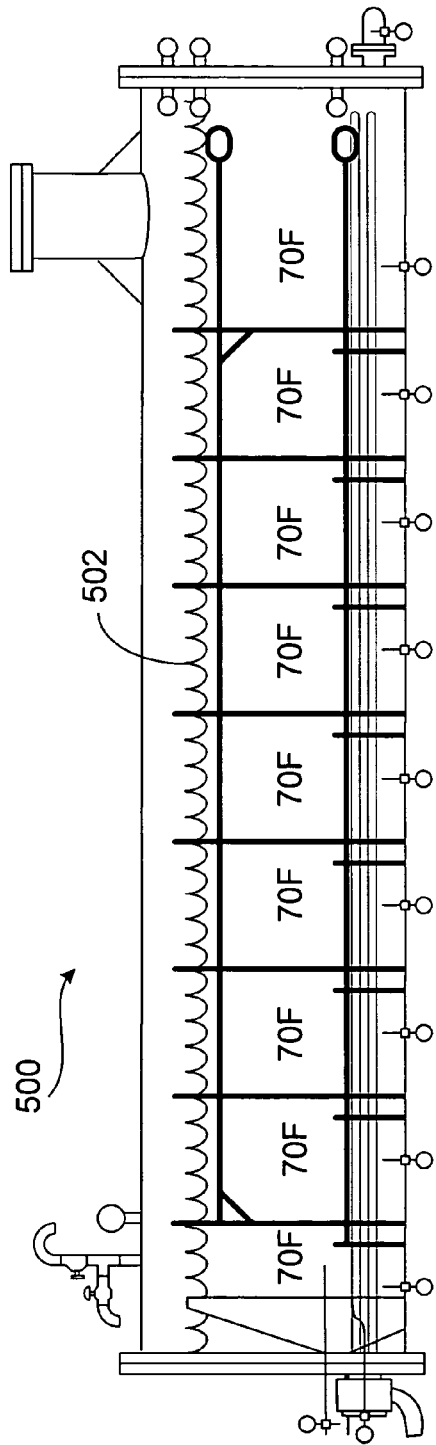
FIG. 5 illustrates a cross-section of a boiler when it is first filled with a hydrous feedstock compound.
Figure 6:
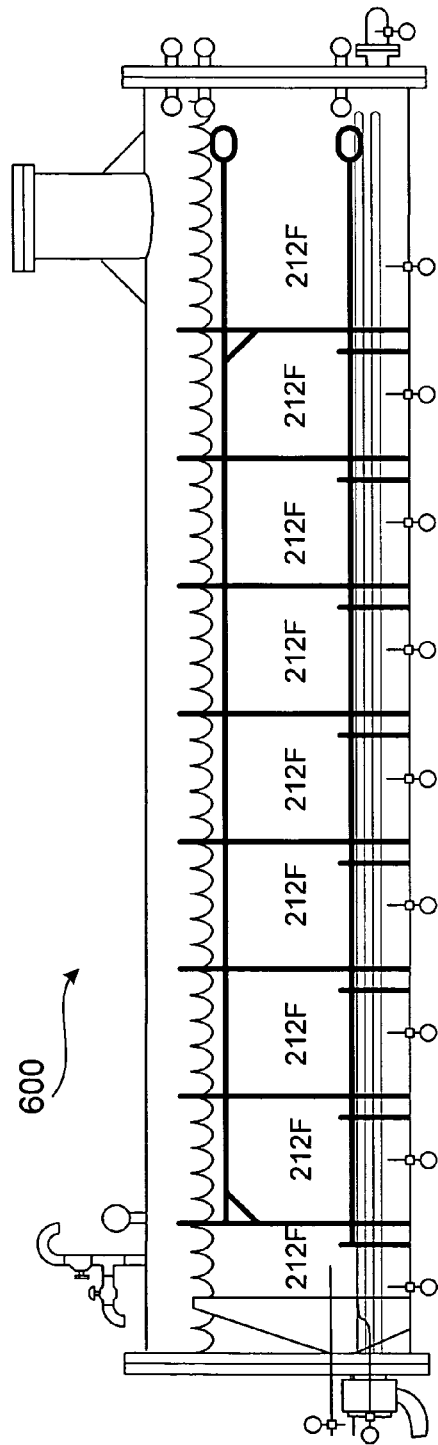
FIG. 6 illustrates a cross-section of the boiler when it is heated with the hydrous feedstock compound and ethanol being removed after initial fill.
Figure 7:
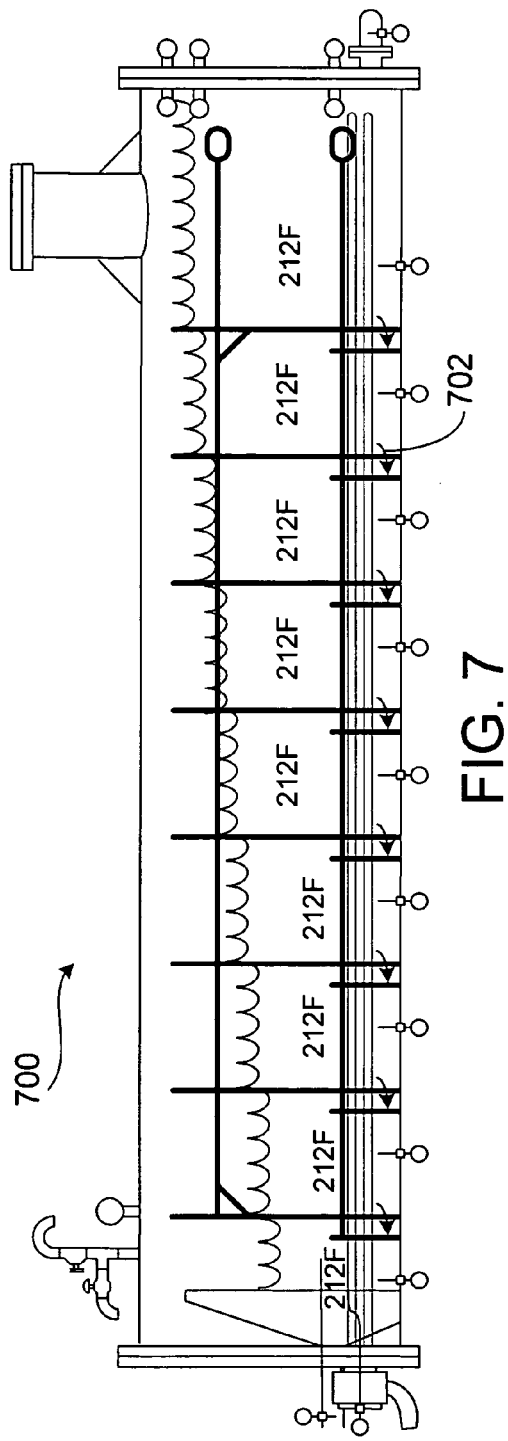
FIG. 7 illustrates a cross-section of the boiler during the removal of the hydrous feedstock compound from the boiler after initial fill.
Figure 8:
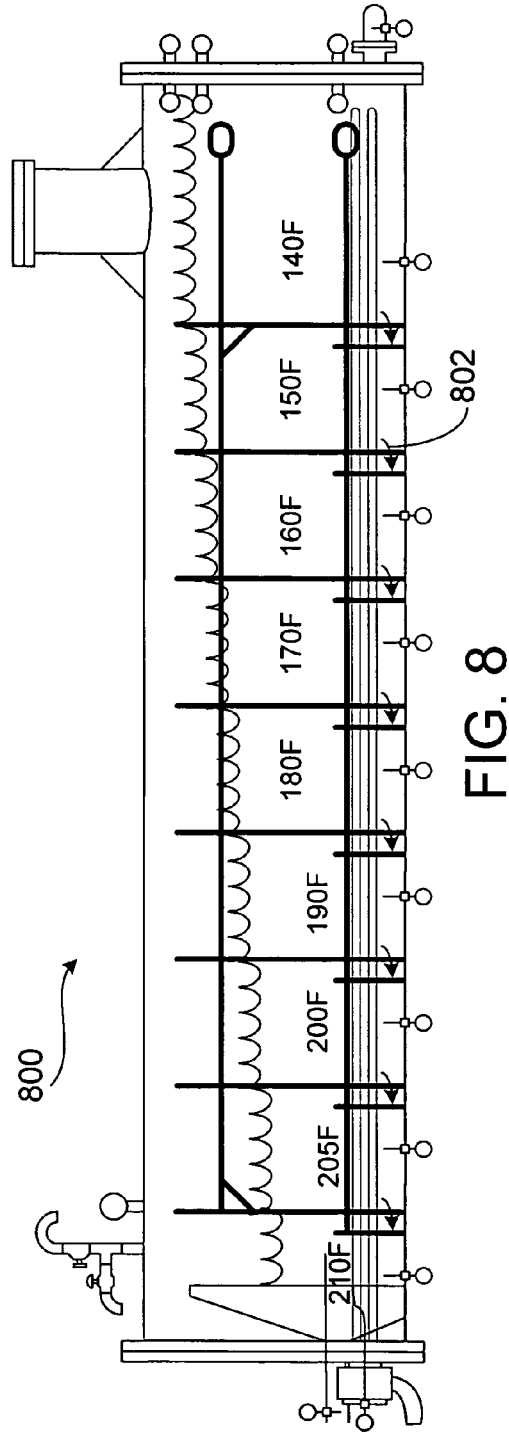
FIG. 8 illustrates a cross-section of the boiler during the replenishment of the hydrous feedstock compound into the boiler after initial fill.

In operation, an ethanol rich, semi-liquid feedstock is fed into the boiler 100 as shown in FIG. 5, where the feedstock is at a room temperature of 70° F. Once inside the boiler 100, the semi-liquid feedstock is heated up as shown in FIG. 6, where the feedstock is shown with 212° F., enabling the ethanol inside the semi-liquid feedstock to vaporize. The vapor is collected by the separator column for further processing. After the semi-liquid feedstock reaches a predefined temperature detected by the thermo-controller 124, the connection 122 to an external tank is open and the semi-liquid feedstock flows out from the collector 120 as shown in FIG. 7. The feedstock that flows out from the boiler 100 can be used to pre-heat the replenishment feedstock that will be entering into the boiler 100. The level of the semi-liquid feedstock in each zone drops as the feedstock flows from one zone to another toward the outlet 120. When the level of the feedstock drops to a certain level, the inlet 112 is open and the replacement feedstock of lower temperature flows in as shown in FIG. 8. The newly arrived feedstock is mixed with the remaining feedstock, thus raising the temperature of new mixture. The newly arrived feedstock enters into the first zone, raises its level, and forces the feedstock in the first zone to flow to the adjacent zone. As the feedstock flows from one zone to another, the level tends to adjust to the same level as shown in FIG. 9 and the distillation process described above repeats itself.

The boiler 100 can also support a continuous distillation process. After the boiler 100 is filled with the feedstock as shown in FIGS. 5 and 6, when the temperature reaches a predefined level, the outlet 122 is open and the feedstock flows out from the boiler 100. As the outlet 122 is open, the inlet 112 is also open to allow new feedstock to flow in. As the cooler feedstock flows in from the inlet 112 and hotter feedstock flows out from the outlet 122, the flow of the feedstock inside the boiler 100 is depicted in FIG. 8. The semi-liquid feedstock moves continuously from one zone to an adjacent zone. As the ethanol vaporizes, the concentration of the semi-liquid feedstock changes slightly, thus the temperature also increases slightly. With a the addition of heat, additional ethanol still inside the semi-liquid feedstock vaporizes, thus producing additional vaporized ethanol. This lowers the ethanol concentration and raises the boiling temperature of the feedstock. When the semi-liquid feedstock reaches a last zone, it will be heated up to a predetermined temperature. At the predetermined temperature, most of ethanol inside the semi-liquid feedstock would have been vaporized, and the remaining semi-liquid feedstock can then be removed from the boiler 100. As the remaining semi-liquid feedstock is removed from the boiler 100, new semi-liquid feedstock is added into the boiler 100 in a continuous fashion. An equilibrium is established as depicted in FIG. 9.

The boiler 100 is in essence a continuous flow boiler and continuously distills ethanol from a flow of semi-liquid feedstock. New semi-liquid feedstock is added almost constantly whenever the level of the semi-liquid feedstock inside the boiler drops below a predetermined level. The semi-liquid feedstock at the very last zone is also removed continuously after a predetermined temperature is achieved. By adding small amount of semi-liquid feedstock each time, the temperature of the semi-liquid feedstock inside the boiler can be maintained at a high temperature, making vaporization a continuous process, thus maximizing the production capacity and efficiency of the boiler.

Although preferred embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. Moreover, although specific terms are employed herein, they are used in a generic and descriptive sense only, and not for the purposes of limiting the described invention.

What is claimed is:

1. An ethanol boiler for removal of ethanol from an ethanol-containing semi-liquid feedstock, comprising:
   a substantially horizontal main body having a hollow interior thereof, the hollow interior having a top portion and bottom portion and first end and second end;
   the first end including an inlet for admitting a flow of the semi-liquid feedstock into the interior of the body;
   the second end including an outlet for the semi-liquid feedstock;
   a plurality of baffle plates within the interior of the body between the first end and second end, each baffle plate having at least one passage therethrough to permit passage of the semi-liquid feedstock from the inlet to the outlet, wherein the plurality of baffle plates comprises at least one primary baffle plate and at least one secondary baffle plate;

at least one heating element for heating the semi-liquid feedstock to vaporize at least some of the ethanol in the semi-liquid feedstock while the semi-liquid feedstock passes from the inlet to the outlet, wherein the at least one heating element comprises at least one electrical heating rod;

at least one vent on the top portion of the body, the vent allowing vaporous ethanol to exit from the interior of the body;

wherein the at least one heating element passes through and is held by the plurality of baffle plates.

2. The ethanol boiler of claim 1, wherein the plurality of baffle plates includes at least a second passage for the semi-liquid feedstock.

3. The ethanol boiler of claim 1, further comprising:
a liquid level controller for sensing a level of the semi-liquid feedstock;
an underfill level controller for sensing underfill condition; and
an overfill level controller for sensing an overflow condition.

4. The ethanol boiler of claim 1, further comprising a thermo-controller for sensing a temperature of the semi-liquid feedstock inside the ethanol boiler.

5. A boiler for removing ethanol from a hydrous feedstock compound containing ethanol, comprising:
a cylindrical means having an internal chamber, a first end and a second end;
a first enclosure means attached to the first end;
a second enclosure means attached to the second end;
a plurality of separator means inside the internal chamber and dividing the internal chamber into a plurality of zones, each separator means having at least one passage that enables flow of the hydrous feedstock compound from one zone to another zone, wherein the plurality of separator means comprises at least one primary separator means and at least one secondary separator means;
at least one heating means for heating the hydrous feedstock compound to vaporize at least some of the ethanol in the hydrous feedstock compound, wherein the at least one heating means comprises at least one electrical heating rod; and
means for collecting ethanol vapor resulting from heating of the hydrous feedstock compound;
wherein the at least one heating means passes through and is held by the plurality of separator means.

6. The boiler of claim 5, further comprising an input means attached to the first enclosure means enabling flow of the hydrous feedstock compound into the boiler.

7. The boiler of claim 5, further comprising an output means attached to the second enclosure means enabling flow of the hydrous feedstock compound out of the boiler.

8. The boiler of claim 5, further comprising:
means for sensing a level of the hydrous feedstock compound;
means for sensing an underfill condition; and
means for sensing an overflow condition.

9. The boiler of claim 5, further comprising means for sensing a temperature of the hydrous feedstock compound inside the boiler.

10. A method for removal of ethanol from an ethanol-containing semi-liquid feedstock using an ethanol boiler, the ethanol boiler comprising a substantially horizontal main body having a hollow interior thereof, the hollow interior having a top portion and bottom portion and first end and second end, the method comprising:
admitting a flow of the semi-liquid feedstock into the interior of the body via an inlet on the first end of the ethanol boiler;
passing the semi-liquid feedstock from the inlet through a plurality of baffle plates to an outlet on the second end of the ethanol boiler, wherein the plurality of baffle plates are located within the interior of the body between the first end and second end, each baffle plate having at least one passage therethrough to permit passage of the semi-liquid feedstock, wherein the plurality of baffle plates comprises at least one primary baffle plate and at least one secondary baffle plate;
vaporizing at least some of the ethanol in the semi-liquid feedstock while the semi-liquid feedstock passes from the inlet to the outlet, wherein the vaporizing comprises heating the semi-liquid feedstock using at least one heating element, wherein the at least one heating element comprises at least one electrical heating rod; and
venting vaporous ethanol from the interior of the body to the exterior of the body via at least one vent on the top portion of the body;
wherein the at least one heating element passes through and is held by the plurality of baffle plates.

* * * * *